(12) United States Patent
Johnson

(10) Patent No.: US 7,227,740 B2
(45) Date of Patent: Jun. 5, 2007

(54) BUS SHROUD

(75) Inventor: Jeffrey Lee Johnson, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 90 days.

(21) Appl. No.: 11/012,578

(22) Filed: Dec. 15, 2004

(65) Prior Publication Data
US 2006/0126279 A1 Jun. 15, 2006

(51) Int. Cl.
*H02B 1/20* (2006.01)

(52) U.S. Cl. ............... 361/624; 361/611; 361/637; 361/648; 361/675; 174/99 B

(58) Field of Classification Search .......... 361/605, 361/611, 624, 652, 675, 614, 622, 636, 801, 361/802, 809, 810, 771, 825, 832; 174/70 B, 174/72 B, 99 B, 68.2, 149 B, 71 B, 153 G, 174/133 B, 156, 65 R; 439/212, 213; 248/27.1, 248/222.12, 223.41, 224.51, 224.8, 224.61
See application file for complete search history.

(56) References Cited

U.S. PATENT DOCUMENTS 5,847,321 A * 12/1998 Carle et al. ............ 174/99 B
5,949,641 A * 9/1999 Walker et al. .......... 361/600
6,020,558 A 2/2000 Wilkie, II et al.
6,362,952 B1 * 3/2002 Schoonover et al. ...... 361/648
6,549,428 B1 * 4/2003 Fontana et al. .......... 361/825
6,636,401 B1 10/2003 Meiners et al.
6,813,142 B1 * 11/2004 Seff ...................... 361/637
2006/0002056 A1 * 1/2006 Abrahamsen et al. ..... 361/652

* cited by examiner

*Primary Examiner*—Michael Datskovskiy
(74) *Attorney, Agent, or Firm*—Martin J. Moran

(57) ABSTRACT

A non-conductive bus shroud for a dual circuit breaker system that has a plurality of vertical walls extending generally perpendicular from the top side and including at least one bus member support vertical wall. The dual circuit breaker system includes a housing assembly having a back wall, a first circuit breaker having at least one protruding line terminal, a second circuit breaker having at least one protruding line terminal and at least one bus member extending between the at least one first circuit breaker line terminal and the at least one second circuit breaker line terminal. The bus shroud has a planar member with a top side, a bottom side, a front edge, a back edge, at least one first circuit breaker terminal opening, and a second circuit breaker terminal opening. When the shroud is installed over the circuit breakers, the vertical walls protect and support the bus member.

26 Claims, 3 Drawing Sheets

BUS SHROUD

BACKGROUND OF THE INVENTION

1. Field of the Invention

The present invention relates to a shroud for a dual circuit breaker system and, more specifically, to a non-conductive shroud that is structured to support the bus member extending between the two circuit breakers.

2. Background Information

As shown in FIG. 1, a dual circuit breaker system includes a main, or first, circuit breaker 1 and a secondary main, or second, circuit breaker 2. As described herein, the circuit breakers are two-pole circuit breakers each having a first and second line terminal. Both circuit breakers are disposed in a housing assembly 3. In the prior art, the first circuit breaker was disposed at a lower location than the second circuit breaker. Two lines 4, 5 connected to a power source extended into the housing assembly 3 and were coupled to a bus assembly 6. The bus assembly 6 had a first set of buses extending downwardly to the first circuit breaker and laterally to the second circuit breaker. The bus assembly 6 was structured to couple one line 4, 5 to each of the circuit breakers' line terminals. The bus assembly 6 was partially covered by an insulator secured with tape. This insulator did not provide support to the bus assembly. This lack of support made the installation of the bus assembly 6 difficult as the second circuit breaker 2 had to be disassembled in order to position the bus members. The insulator also did not extend between the bus assembly and the housing assembly either on the back side, or between the bus assembly 6 and the housing assembly cover. Additionally, it was possible to install the insulator with missing components, thereby diminishing the safety of those working on or near the dual circuit breaker system.

There is, therefore, a need for a bus shroud structured to better enclose the busing connecting the two circuit breakers.

There is a further need for a bus shroud structured to support the bus members.

There is a further need for a bus shroud that is incorporated into the assembly of the dual circuit breaker system so that the bus shroud must be installed to complete the system.

SUMMARY OF THE INVENTION

These needs, and others, are met by the present invention which provides a bus shroud having a planar member structured to extend over both circuit breakers and a plurality of vertical walls. The shroud is structured to be coupled to two circuit breakers which have generally laterally aligned line terminals. That is, unlike the prior art, the first circuit breaker is not disposed at a lower location than the second circuit breaker in the housing assembly.

The vertical walls are structured to support the bus members and position the bus members. Additional vertical walls extend in front of and behind the bus members. The shroud is structured to be part of the circuit breaker support assembly so that the shroud must be in place in order to complete the dual circuit breaker system. The shroud also acts as an alignment and anti-rotation device for securing the alignment of the circuit breakers. That is, the shroud includes openings through which the circuit breaker terminals extend. The openings are sized to be slightly larger than the circuit breaker terminals, thus, if the circuit breaker is moved or rotated, the terminals will contact the shroud thereby resisting further movement or rotation. The shroud further defines the location of the second circuit breaker for those installations where the second circuit breaker is installed at later time than the first circuit breaker.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, directional terms, such as "above" and "below" relate to the components as shown in the Figures and are not limiting upon the claims.

Figure 1:
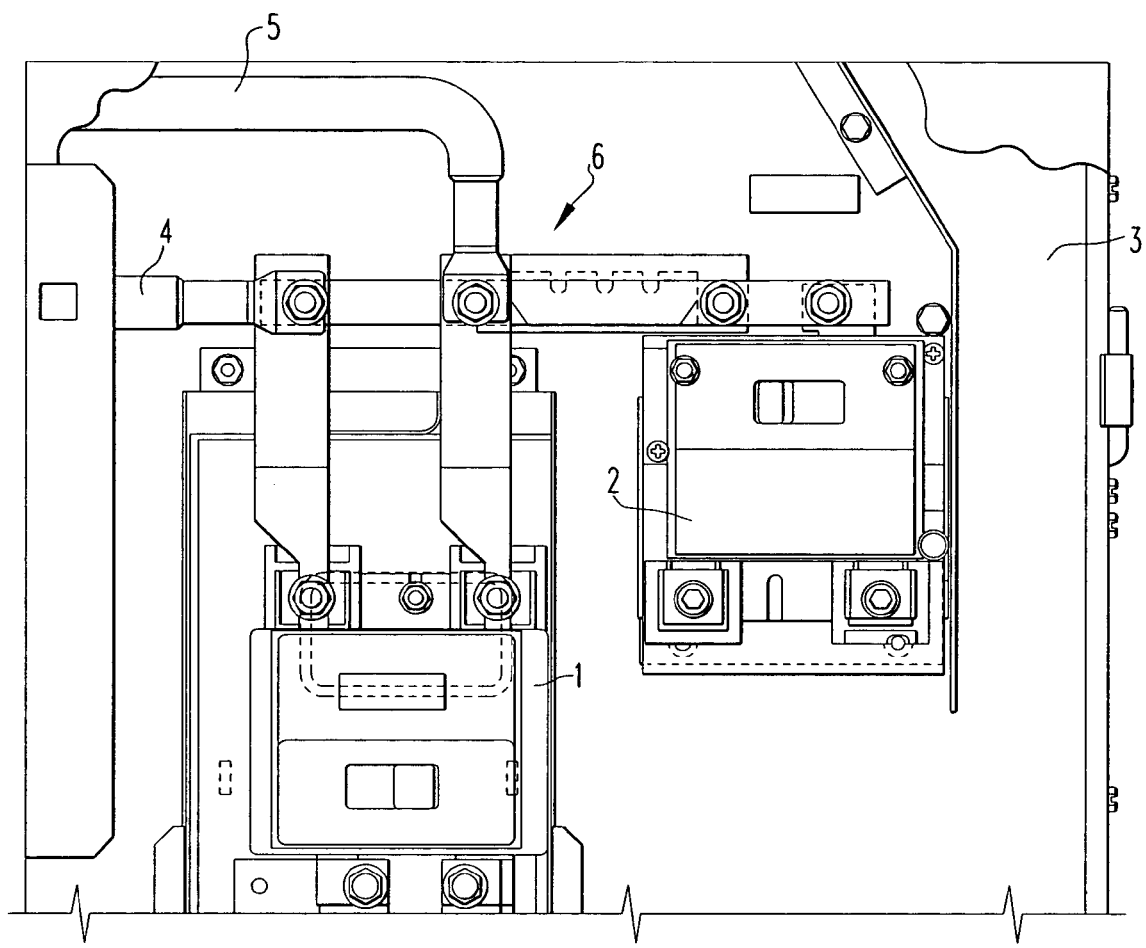
FIG. 1 is a front view of the prior art dual circuit breaker system.
Figure 2:
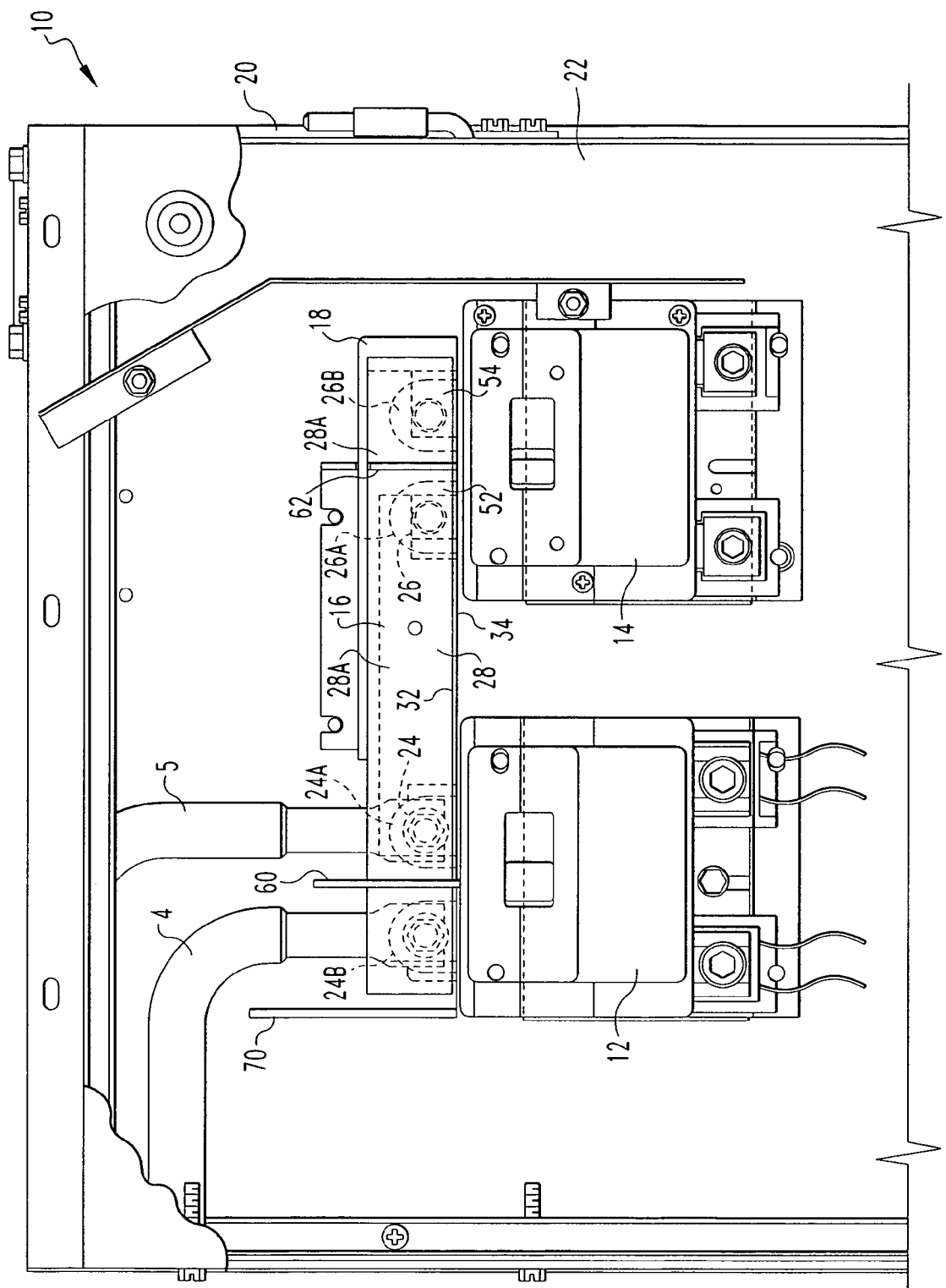
FIG. 2 is a front view of a dual circuit breaker system.

As shown in FIG. 2, a dual circuit breaker system 10 includes a first circuit breaker 12, a second circuit breaker 14, a bus assembly 16, a bus shroud 18, and a housing assembly having a back wall 22 and movable cover or a door (not shown). The first circuit breaker 12 and second circuit breaker 14 are disposed in the housing assembly 20. At least one line 4 extends into the housing assembly 20. Each circuit breaker 12, 14 includes at least one protruding line terminal 24, 26, respectively, extending upwardly. The bus assembly 16 includes at least one bus member 28 which is structured to be coupled to, and in electrical communication with, both the first circuit breaker line at least one terminal 24 and the second circuit breaker at least one line terminal 26.

Figure 3:
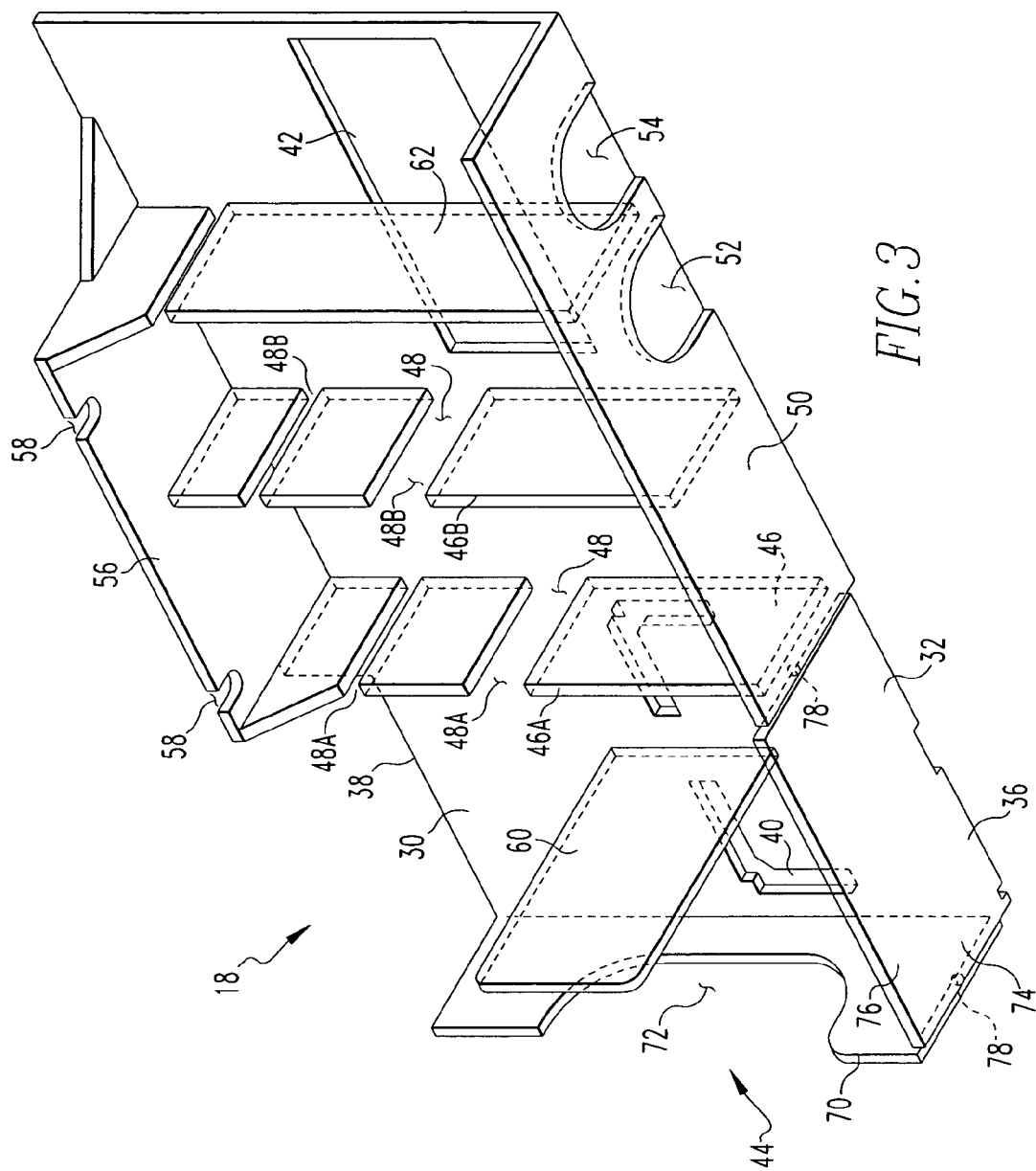
FIG. 3 is an isometric view of the bus shroud.

As shown best in FIG. 3, the shroud 18, which is made from a non-conductive material, includes a planar member 30 having a top side 32, a bottom side 34 (FIG. 2), a front edge 36, and a back edge 38. Preferably, the planar member 30 is rectangular. The planar member 30 has at least one first circuit breaker terminal opening 40, and a second circuit breaker terminal opening 42 structured to allow the first circuit breaker at least one line terminal 24 and the second circuit breaker at least one line terminal 26 to pass through the planar member 30. Preferably, the at least one first circuit breaker terminal opening 40 is sized to have a cross-sectional area that is just slightly larger than the first circuit breaker at least one line terminal 24.

The shroud 18 further includes a plurality 44 of vertical walls extending generally perpendicular from the top side 32. The plurality 44 of vertical walls includes at least one bus support vertical wall 46. The at least one bus support vertical wall 46 extends in a line between the front edge 36 and the back edge 38 of the planar member 30. The at least one bus support vertical wall 46 includes at least one bar member gap 48. The bar member gap 48 is sized to allow the at least one bus member 28 to pass therethrough. In a preferred embodiment, the shroud 18 includes two bus support vertical wall 46A, 46B, extending generally parallel to, and spaced from, each other. Each bus support vertical wall 46A, 46B includes at least one bar member gap 48. The plurality 44 of vertical walls may include a front vertical wall 50. The front vertical wall 50 is structured to extend over the second circuit breaker 14 when the second circuit breaker at least one line terminal 26 is positioned through the second circuit breaker terminal opening 42. The front wall 50 may include access openings 52, 54 positioned adjacent to the second circuit breaker at least one line terminal 26.

The plurality 44 of vertical walls may include a back wall 56. The back vertical wall 56 is structured to extend between the first and second circuit breakers 12, 14 when the second circuit breaker at least one line terminal 26 is positioned through the second circuit breaker terminal opening 42. The back vertical wall 56 includes an attachment device 58, such as one or more cutouts through which a fastener may be inserted. The attachment device 58 is structured to engage the housing assembly back wall 22. In this manner the shroud 18 becomes part of the mounting assembly for the circuit breakers 12, 14 and the circuit breakers 12, 14 cannot be installed without the shroud 18 being in place.

In the preferred embodiment, the first and second circuit breakers 12, 14 are two-pole circuit breakers each having a first line terminal 24A, 26A, respectively, and a second line terminal 24B, 26B respectively. The circuit breakers 12, 14 are disposed in the housing assembly 20. Each line terminal 24A, 24B of the first circuit breaker 12 is coupled to a single line 4, 5 which extends into the housing assembly 20 and which is coupled to a power source. The bus assembly 16 includes a first and second bus member 28A, 28B. The first bus member 28A is coupled to, and in electrical communication with, the first circuit breaker first line terminal 24A and the second circuit breaker first line terminal 26A. The second bus member 28B is coupled to, and in electrical communication with, the first circuit breaker second line terminal 24B and the second circuit breaker second line terminal 26B. The second bus member 28B, preferably, has a U-shape so that the second bus member may be spaced from the first bus member 28A as the two bus members extend between the circuit breakers 12, 14.

In this embodiment the shroud 18 has, preferably, two bus support vertical wall 46A, 46B. Each bus support vertical wall 46A, 46B includes two bus member gaps 48A, 48B. The first bar member gap 48A is sized to allow the first bus member 28A to pass therethrough. The second bar member gap 48B is sized to allow the second bus member 28B to pass therethrough. Additionally, the plurality 44 of vertical walls includes a first terminal separating wall 60 structured to extend between the first circuit breaker first line terminal 24A and the first circuit breaker second pole line terminal 24B when at least one first circuit breaker line terminal is positioned through the at least one first circuit breaker terminal opening 40. Similarly, the plurality 44 of vertical walls includes a second terminal separating wall 62 structured to extend between the second circuit breaker first pole line terminal 26A and the second circuit breaker second pole line terminal 26B when at least one second circuit breaker line terminal 26 is positioned through the second circuit breaker terminal opening 42.

The plurality 44 of vertical walls may further include a sidewall 70 extending from the front edge 36 to the back edge 38 along the left edge adjacent to the first circuit breaker 12. The sidewall 70 may have a cutout 72 structured to allow the two lines 4, 5 to pass therethrough. It is further noted that a rotatable cover 74 may be disposed between the sidewall 70 and the at least one bus support vertical wall 46. The rotatable cover 74 is a generally flat member 76 having two raised hemispheres 78 along opposite edges. The two raised hemispheres 78 are structured to engage two detents on the sidewall 70 and the at least one bus support vertical wall 46 as is known in the art. The rotatable cover 74 is generally parallel with the front vertical wall 50. The rotatable cover 74 may be rotated in order to gain access to the first circuit breaker at least one line terminal 24.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A non-conductive bus shroud for a dual circuit breaker system, said dual circuit breaker system including a housing assembly having a back wall, a first circuit breaker having at least one protruding line terminal, a second circuit breaker having at least one protruding line terminal and at least one bus member extending between said at least one first circuit breaker line terminal and said at least one second circuit breaker line terminal, said shroud comprising:

a planar member having a top side, a bottom side, a front edge, a back edge, at least one first circuit breaker terminal opening, and a second circuit breaker terminal opening; and a plurality of vertical walls extending generally perpendicular from said top side and including at least one bus member support vertical wall.

2. The bus shroud of claim 1 wherein said least one bus member support vertical wall extends between said front edge and said back edge and includes at least one bus member gap sized to allow said bus member to pass therethrough.

3. The bus shroud of claim 1 wherein said least one bus member support vertical wall includes a first support vertical wall and a second support vertical wall, each support vertical wall extending between said front edge and said back edge and including at least one bus member gap sized to allow said bus member to pass therethrough.

4. The bus shroud of claim 1 wherein said plurality of vertical walls includes a front vertical wall structured to extend over said second circuit breaker when said second circuit breaker line terminal is positioned through said second circuit breaker terminal opening.

5. The bus shroud of claim 1 wherein said plurality of vertical walls includes a back vertical wall structured to extend between said first and said second circuit breakers when said second circuit breaker line terminal is positioned through said second circuit breaker terminal opening.

6. The bus shroud of claim 5 wherein said back vertical wall includes an attachment device structured to engage said housing assembly back wall.

7. The bus shroud of claim 1 wherein said first and second circuit breakers are both two-pole circuit breakers each having a first pole protruding line terminal and a second pole protruding line terminal and said at least one bus member extending between said at least one first circuit breaker line terminal and said at least one second circuit breaker line terminal includes a first bus member extending between said first circuit breaker first pole line terminal and said second circuit breaker first pole line terminal and a second bus member extending between said first circuit breaker second pole line terminal and said second circuit breaker second pole line terminal, and wherein:

said least one bus member support vertical wall extends between said front edge and said back edge and includes two bus member gaps sized to allow said first and second bus bars to pass therethrough.

8. The bus shroud of claim 7 wherein said least one bus member support vertical wall includes a first support vertical wall and a second support vertical wall, each support vertical wall extending between said front edge and said back edge and including two bus member gaps sized to allow said first and second bus bars to pass therethrough.

9. The bus shroud of claim 7 wherein said plurality of vertical walls includes a front vertical wall structured to extend over said second circuit breaker when said second circuit breaker line terminal is positioned through said second circuit breaker terminal opening.

10. The bus shroud of claim 7 wherein said plurality of vertical walls includes a back vertical wall structured to extend between said first and said second circuit breakers when said second circuit breaker line terminal is positioned through said second circuit breaker terminal opening.

11. The bus shroud of claim 10 wherein said back vertical wall includes an attachment device structured to engage said housing assembly back wall.

12. The bus shroud of claim 7 wherein said plurality of vertical walls includes a first terminal separating wall structured to extend between said first circuit breaker first pole protruding line terminal said first circuit breaker second pole protruding line terminal when at least one first circuit breaker line terminal is positioned through said at least one first circuit breaker terminal opening.

13. The bus shroud of claim 7 wherein said plurality of vertical walls includes a second terminal separating wall structured to extend between said second circuit breaker first pole protruding line terminal said second circuit breaker second pole protruding line terminal when at least one second circuit breaker line terminal is positioned through said second circuit breaker terminal opening.

14. A dual circuit breaker system comprising:
a housing assembly having a back wall;
a first circuit breaker disposed in said housing assembly, said first circuit breaker having at least one protruding line terminal;
a second circuit breaker disposed in said housing assembly, said second circuit breaker having at least one protruding line terminal;
at least one bus member extending between said at least one first circuit breaker line terminal and said at least one second circuit breaker line terminal;
a non-conductive shroud having a planar member having a top side, a bottom side, a front edge, a back edge, at least one first circuit breaker terminal opening, a second circuit breaker terminal opening, and a plurality of vertical walls extending generally perpendicular from said top side and including at least one bus member support vertical wall.

15. The bus shroud of claim 14 wherein said least one bus member support vertical wall extends between said front edge and said back edge and includes at least one bus member gap sized to allow said bus member to pass therethrough.

16. The bus shroud of claim 14 wherein said least one bus member support vertical wall includes a first support vertical wall and a second support vertical wall, each support vertical wall extending between said front edge and said back edge and including at least one bus member gap sized to allow said bus member to pass therethrough.

17. The bus shroud of claim 14 wherein said plurality of vertical walls includes a front vertical wall structured to extend over said second circuit breaker when said second circuit breaker line terminal is positioned through said second circuit breaker terminal opening.

18. The bus shroud of claim 14 wherein said plurality of vertical walls includes a back vertical wall structured to extend between said first and said second circuit breakers when said second circuit breaker line terminal is positioned through said second circuit breaker terminal opening.

19. The bus shroud of claim 18 wherein said back vertical wall includes an attachment device structured to engage said housing assembly back wall.

20. The bus shroud of claim 14 wherein said first and second circuit breakers are both two-pole circuit breakers each having a first pole protruding line terminal and a second pole protruding line terminal and said at least one bus member extending between said at least one first circuit breaker line terminal and said at least one second circuit breaker line terminal includes a first bus member extending between said first circuit breaker first pole line terminal and said second circuit breaker first pole line terminal and a second bus member extending between said first circuit breaker second pole line terminal and said second circuit breaker second pole line terminal, and wherein:
said least one bus member support vertical wall extends between said front edge and said back edge and includes two bus member gaps sized to allow said first and second bus bars to pass therethrough.

21. The bus shroud of claim 20 wherein said least one bus member support vertical wall includes a first support vertical wall and a second support vertical wall, each support vertical wall extending between said front edge and said back edge and including two bus member gaps sized to allow said first and second bus bars to pass therethrough.

22. The bus shroud of claim 20 wherein said plurality of vertical walls includes a front vertical wall structured to extend over said second circuit breaker when said second circuit breaker line terminal is positioned through said second circuit breaker terminal opening.

23. The bus shroud of claim 20 wherein said plurality of vertical walls includes a back vertical wall structured to extend between said first and said second circuit breakers when said second circuit breaker line terminal is positioned through said second circuit breaker terminal opening.

24. The bus shroud of claim 23 wherein said back vertical wall includes an attachment device structured to engage said housing assembly back wall.

25. The bus shroud of claim 20 wherein said plurality of vertical walls includes a first terminal separating wall structured to extend between said first circuit breaker first pole protruding line terminal said first circuit breaker second pole protruding line terminal when at least one first circuit breaker line terminal is positioned through said at least one first circuit breaker terminal opening.

26. The bus shroud of claim 20 wherein said plurality of vertical walls includes a second terminal separating wall structured to extend between said second circuit breaker first pole protruding line terminal said second circuit breaker second pole protruding line terminal when at least one second circuit breaker line terminal is positioned through said second circuit breaker terminal opening.

* * * * *